United States Patent
Hoellriegl et al.

(10) Patent No.: US 8,579,622 B2
(45) Date of Patent: Nov. 12, 2013

(54) BLOWING MACHINE

(75) Inventors: Thomas Hoellriegl, Teublitz (DE); Andreas Brunner, Aufhausen (DE); Dieter Finger, Neutraubling (DE); Hans-jurgen Fleischmann, Steinberg A.s. (DE); Helmut Sehneider, Regensburg (DE); Florian Geltinger, Donaustauf (DE)

(73) Assignee: Krones AG, Neutraubling (DE)

( * ) Notice: Subject to any disclaimer, the term of this patent is extended or adjusted under 35 U.S.C. 154(b) by 250 days.

(21) Appl. No.: 13/094,866

(22) Filed: Apr. 27, 2011

(65) Prior Publication Data

US 2011/0262574 A1    Oct. 27, 2011

(30) Foreign Application Priority Data

Apr. 27, 2010   (DE) .................. 10 2010 028 253

(51) Int. Cl.
- *B29C 49/08* (2006.01)
- *B29C 49/36* (2006.01)
- *B29C 49/42* (2006.01)

(52) U.S. Cl.
USPC ............ 425/144; 425/526; 425/529; 425/540

(58) Field of Classification Search
USPC .................. 425/144, 526, 529, 540
See application file for complete search history.

(56) References Cited

U.S. PATENT DOCUMENTS

| | | | |
|---|---|---|---|
| 4,741,688 A | 5/1988 | Aoki | |
| 2007/0284789 A1* | 12/2007 | Danel et al. | 264/532 |
| 2009/0108505 A1* | 4/2009 | Steiner | 264/535 |
| 2011/0241265 A1* | 10/2011 | Schmidt | 264/532 |

FOREIGN PATENT DOCUMENTS

| | | |
|---|---|---|
| DE | 20309576 | 11/2003 |
| DE | 102005000681 | 7/2006 |
| DE | 102008012757 A1 | 9/2009 |
| DE | 102008029531 | 12/2009 |
| DE | 102009035868 | 3/2011 |
| EP | 1061649 A1 | 2/2000 |
| EP | 1563984 | 8/2005 |
| WO | WO-9732713 A1 | 9/1997 |
| WO | WO-2006/108380 A2 | 10/2006 |
| WO | WO-2010057325 A1 | 5/2010 |

OTHER PUBLICATIONS

Search Report for DE 10 2010 028 253.7.
Notification of the First Office Action, The State Intellectual Property Office of the People's Republic of China, Application No. 201110111959.9, dated May 31, 2013.

* cited by examiner

*Primary Examiner* — Robert B Davis
(74) *Attorney, Agent, or Firm* — Marshall, Gerstein & Borun LLP

(57) ABSTRACT

A blowing machine used to produce containers of correctly temperatured preforms in blowing stations including correctly temperatured blow molds, having functional get-up components such as at least electric servomotors assigned to at least the blowing stations to control and/or monitor secondary functions of functional get-up components during production. In order to bring at least some of said functional get-up components for secondary functions to the correct temperature, an electrically operated, controllable liquid temperature control system is supplied by at least one temperature control device and is integrated into the blowing machine and guided through the functional get-up components.

8 Claims, 3 Drawing Sheets

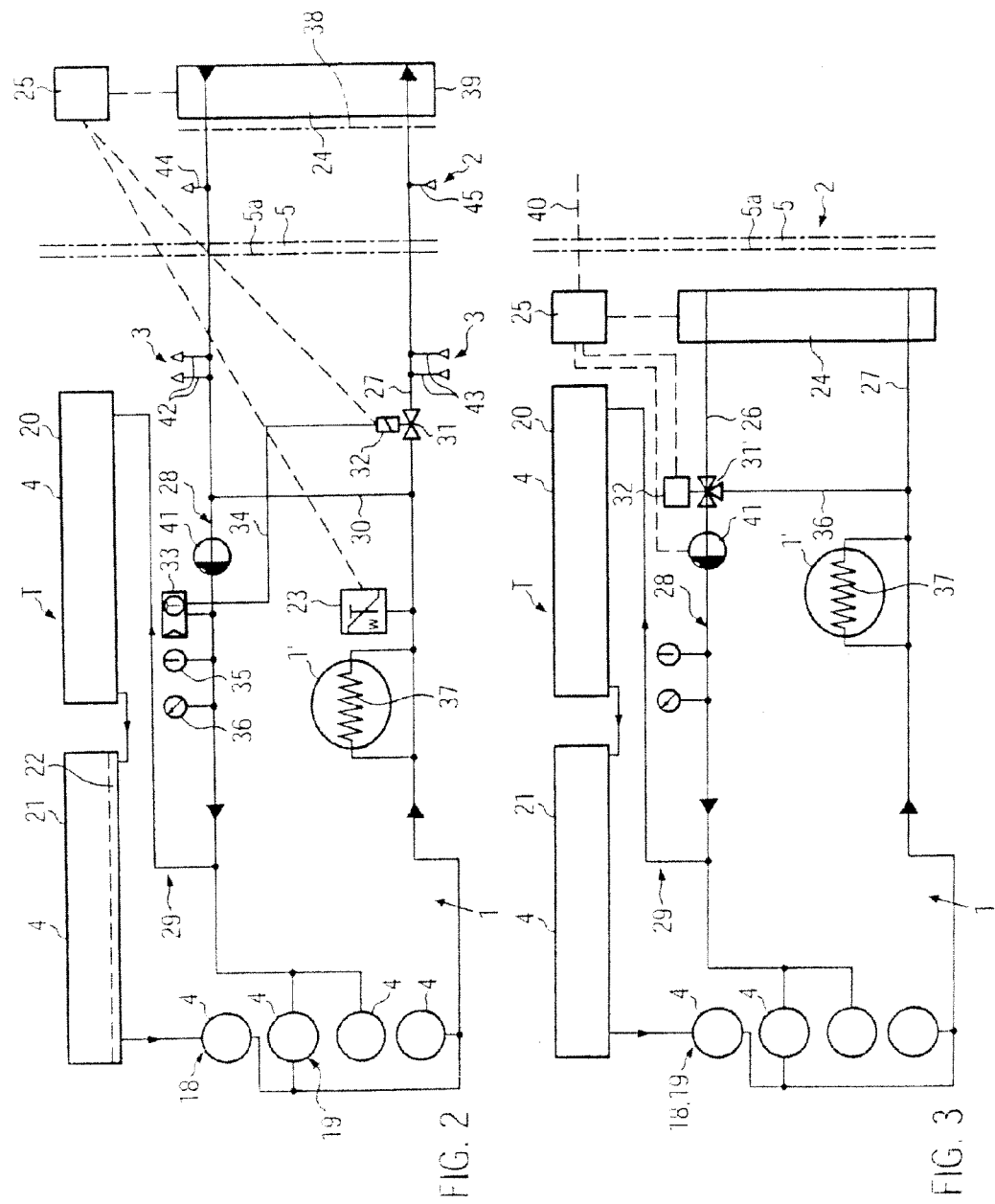

BLOWING MACHINE

CROSS-REFERENCE TO RELATED APPLICATION

The present application claims the benefit of priority of German Application No. 102010028253.7, filed Apr. 27, 2010. The entire text of the priority application is incorporated herein by reference in its entirety.

FIELD OF THE DISCLOSURE

The disclosure relates to a blowing machine such as used in blow molding of performs used for bottling operations.

BACKGROUND

In the past, secondary functions such as stretching bar motions or relative motions of other components in blowing machines, particularly stretch blow-molding machines, were controlled by curve controls, if need be in combination with pneumatic cylinders. More recent developments of blowing machines give up this established principle and include functional get-up components comprising at least electric servomotors to control such secondary functions, typically frequency converter servomotors, wherein frequency converters and/or control and monitoring means of electric or electronic structure might also be provided at or within the blowing stations. When constructed in solid manner, especially modern electric servomotors perform sufficiently and allow for a very sensitive motion control and, if necessary, for individual control sequences, e.g. in the blowing stations. Such drive systems with electric servomotors may also be used in the blowing machine for other secondary functions outside the blowing stations, e.g. in a stationary part of the blowing machine. However, there is generally a high temperature load, e.g. in case of blowing machines especially in the blowing stations, and both electric servomotors and electronic or electric control means and drive means such as frequency converters produce considerable heat during production, or heat is coupled into said functional get-up components due to a high temperature level. But, to ensure trouble-free operation and a long service life, such functional get-up components require specific operating temperatures. This applies to, both, to blowing machines in which the blowing stations are located in a rotating part and to blowing machines with stationarily arranged blowing stations.

EP 1 061 649 A discloses a stretch blow-molding machine with stationary blowing stations, with electric servomotors being installed for the blowing stations as functional get-up components for the secondary function of stretching, said motors controlling the stretching bar motion via toothed belts and being assigned to control units in the blowing stations.

WO 2006/108380 A refers to a stretch blow-molding machine with a blowing wheel as rotating part at which are provided the blowing stations and electric linear motors as functional get-up components for secondary functions such as the stretching bar motion control combined with fluid drives.

DE 10 2008 012 757 A discloses a stretch blow-molding machine with blowing stations in a rotating part. The rotating part is a blowing wheel positioned, e.g. on a platform in the stationary part and into which lines for substances run through a rotary union. Electric servomotors, typically frequency converting linear motors, with frequency converters and an electronic control unit per each blowing station have been installed into the blowing stations. Each of said electric control units does not only control the stretching bar motion but also air blast valves.

After all, it has been known from experience that in case of stretch blow-molding machines with blowing stations being arranged at a blowing wheel, particularly for the blow molds, to install a primary function liquid temperature control system that is connected to an external liquid supply via a rotary unit. Multiple forward and backward runs for the shell molds and floor molds extend from the rotary unit to all blow molds. The temperature level is set, controlled and monitored in the stationary part or outside the stretch blow-molding machine, respectively. The primary function temperature control system is provided with a heating unit that brings the preforms to the correct temperature before they are transferred to the blow molds.

SUMMARY OF THE DISCLOSURE

An aspect of the disclosure is to provide a blow-molding machine of the kind as initially mentioned as operating, due to an optimized thermal balance of functional get-up components for secondary functions during production, at a high process and operating reliability over long service lives.

Irrespective of the question, whether the functional get-up components for secondary functions during production produce heat or are heated up due to heat coupling from the environments or are cooled down too much due to cold local ambient temperature conditions, a substantially optimal and individual operating temperature can be set and hold for each functional get-up component integrated therein by means of said liquid temperature control system. This contributes to process reliability and increases operating reliability of the blowing machine during production. Preferably, these are functional get-up components such as electric servomotors, drive means thereof with frequency converters, electric or electronic control units, and other driving components.

In a useful embodiment the liquid temperature control system for the functional get-up components of secondary functions comprises multiple combined temperature control circuits of which at least two can be operated during production at different temperature levels so that, due to the selection of the corresponding temperature control circuit, the optimal operating temperatures can be set and held for the functional get-up components integrated therein.

In a useful embodiment the liquid temperature control system of the functional get-up components of secondary functions is combined with the primary function temperature control system of the blow molds. This leads to structural simplifications in the blowing machine, and, starting from perhaps just one supply, the required different temperature levels can yet be set. Moreover, one and the same heat transfer medium, e.g. water, used for the get-up components can be used, sometimes mixed with additives or oil.

Even though the inventive principle can also be applied to a blowing machine with stationary blowing stations, the blowing machine of a preferred embodiment comprises a stationary part during production and at least one part with blowing stations rotating relative to said stationary part, primarily a blowing wheel. Common temperature control circuits of the liquid temperature control system have been assigned to the functional get-up components to be provided with the correct temperature at least in the blowing stations in the rotating part. This does, however, not exclude, as in case of the rotating part, to assign a common supply or common forward and backward runs to the temperature control circuits arranged in the stationary part for the functional get-up components of secondary functions arranged therein.

In a useful embodiment the temperature control device is located outside the blowing machine or in the stationary part or in the rotating part and combined with the temperature control circuits through just one forward run and just one backward run. The temperature level adjustment is done in the temperature control circuits.

As already mentioned, at least one temperature control circuit can be provided in the stationary part for functional get-up components provided therein, such circuit primarily being connected to either the temperature control device or to the forward and the backward runs and, if necessary, being operable at at least one individual temperature level.

In another embodiment the temperature control device provided outside the blowing machine or inside the stationary part is connected with the at least one temperature control circuit in the rotating part via a rotary union between said stationary and said rotating part. A forward and a backward run for feeding the possibly multiple temperature control circuits in said rotating part are provided in said rotary union. The rotary union may be a separate rotary union, or is, anyhow, a liquid rotary union used to bring the blow molds to the correct temperature. Alternatively, an air pressure rotary union may also be used for this purpose or even a combined liquid/air pressure rotary union between the stationary and the rotating part. Making use of a rotary union provided already for other reasons facilitates the installation of the liquid temperature control system. The rotary union may be provided either above or below a bearing ring rim.

In a useful embodiment the liquid temperature control system inclusive the temperature control device in the rotating part common for all functional get-up components of secondary functions has been designed as a stand-alone system with regard to the heat transfer liquid, e.g. water or oil. This means that at least during production of the blowing machine said liquid temperature control system can do without external liquid supply. However, the operating voltage and/or electrical signals are primarily supplied via a collector ring arrangement between the rotating and the stationary parts of the blowing machine.

In a useful embodiment the functional get-up components for secondary functions comprise not only electric servomotors in form of frequency converting rotary motors and/or linear motors but also at least electric or electronic control means and driving means and/or casings or control boxes therefor and/or at least one air conditioning device within a temperature control circuit and/or in the forward or backward run for additional local liquid temperature control and/or cooling elements such as rear wall cooling elements for frequency converters and/or a platform area in the stationary or rotating part, etc. Each of the functional get-up components is provided with intake and escape connections for implementation into the respective temperature control circuit. Multiple functional get-up components may be incorporated into the respective temperature control circuit either in series or in parallel or combined in series and in parallel, wherein, if need be, functional get-up components requiring more heating or cooling are placed upstream of others requiring less heating or cooling.

In yet another embodiment frequency converters and/or control means of the servomotors are structurally separated from said servomotors, in order to most widely exclude any mutual heat coupling and, if need be, are either individually or in groups or in common integrated into at least one temperature control circuit. An air conditioning device in at least one temperature control circle or backward run is, for example, electrically operated and withdraws heat from said temperature control circuit or from said backward run and dissipates such heat into the surrounding environment or collects heat from said environment and dissipates it e.g. into the forward run. If need be, such air conditioning device is interconnected like a heat exchanger used to feed withdrawn heat into another temperature control system, e.g. into the blow mold temperature control system.

In another useful embodiment the thermal balance of functional get-up components for secondary functions is further improved in supporting manner in that at least one functional get-up component can be impinged with a cooling, directed air flow and is therefore provided with cooling characteristics such as cooling ribs or cold plates onto which the air flow can impinge to obtain the correct temperature. The air flow may affect the functional get-up component from the stationary part via e.g. blowers or can be derived from the relative rotary motion of the rotating part and directed to the functional get-up component and/or may be generated by supplying an expansion-cooled air blast ejected during production by blowing stations.

In a useful embodiment a major temperature control circuit connected to the forward and the backward runs comprises at least one circulation pump, a bypass connection upstream of said circulation pump between forward and backward runs, and at least one electrically operable mixing valve located in the forward and the backward runs. At least the major temperature control circuit is similarly operated as modern building heating plants by controlling or regulating the desired temperature level of the temperature control circuit through the mixing valve located in the forward or the backward run, the mixing valve not only being able to take an on-off position but also, if need be, to carry out flow rate control and/or to perform cyclic operation.

In a specific embodiment a two-way mixing valve with an electric actuator such as an operating magnet is arranged in the backward run downstream of the bypass connection and can for example at least be controlled via one sensor that can be provided downstream of the circulation pump. The sensor may either be a temperature sensor, or a pressure sensor, or a flow rate sensor. Each sensor in question can also be used for monitoring or diagnostic purposes. The two-way mixing valve in the backward run controls, e.g. in accordance with the sensor, which of the flow rates to the temperature control device will be allowed to pass through or which of the flow rates from the temperature control device will be sucked in by said circulation pump.

In another embodiment a three-way mixing valve with actuator has been arranged in the forward run upstream of the circulation pump in a junction between forward run and bypass connection. Said three-way mixing valve controls the flow rates in the forward run and in the bypass connection.

In a useful embodiment the major temperature control circuit is guided via at least one functional get-up component such as an electric servomotor or its frequency converter, preferably via multiple functional get-up components connected in series or in parallel for temperature control reasons and downstream thereof via the blowing wheel or a cooling or heating distance in said blowing wheel. The get-up components are of a lower temperature level than the blowing wheel that is primarily heated through heat coupling and can stand a higher operating temperature level than the functional get-up components for secondary functions.

In a useful embodiment an auxiliary temperature control circuit branches from the major temperature control circuit downstream of the circulation pump to at least one control box, cooling element, servomotor or frequency converter, primarily even to multiple users connected in parallel and/or in series. The auxiliary temperature control circuit can be operated at a temperature level that differs to that one of the major temperature control circuit and/or at a lower flow rate. An auxiliary temperature control circuit might additionally be equipped like the major temperature control circuit, e.g. with a circulation pump and/or a mixing valve and/or at least one sensor.

Expediently, the liquid temperature control system can be operated via at least one, primarily programmable, central control unit, preferably either for the controlled cooling or for the controlled heating. It is useful to arrange the central control unit in the stationary part or even outside the blowing machine so that during production of the blowing machine parameter settings can be done at any time. The central control unit can be connected to corresponding sensors in the forward run, the backward run, the temperature control device and components of the temperature control circuits, to be able at any time to obtain information on the temperature levels and, if need be, also to carry out diagnostic cycles.

In a useful embodiment each of said blowing stations comprises an electric servo/linear motor as direct drive for stretching bars. The stator of the servo/linear motor comprises e.g. a cooling jacket with intake and escape connections for installation in a temperature control circuit and is brought to the desired temperature in said temperature control circuit. Alternatively or additionally, the stator can be mounted onto or into a cooling element integrated into the same or another temperature control circuit, in order to support or carry out the temperature control of the servo/linear motor. In the latter case a standard servo/linear motor without cooling jacket can be used, if required.

BRIEF DESCRIPTION OF THE DRAWINGS

In the following, embodiments of the subject matter of the disclosure will be explained in detail, wherein:

FIG. 2 is a block diagram of a liquid temperature control system, for example of the blowing machine of FIG. 1, FIG. 3 is another embodiment of a liquid temperature control system, for example for the blowing machine of FIG. 1.

DETAILED DESCRIPTION OF THE PREFERRED EMBODIMENT

Figure 1:
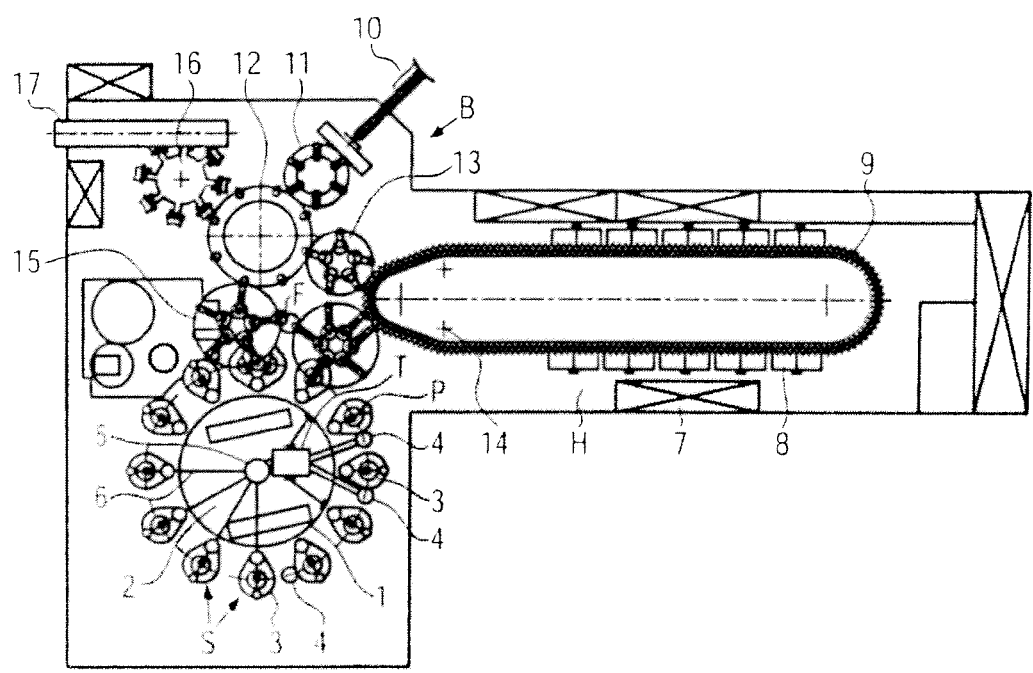
FIG. 1 is a schematic plan view of an embodiment of a blowing machine.

FIG. 1 illustrates as schematic plan view a design of a blowing machine B, particularly a stretch blow-molding machine, for continuously manufacturing containers F of preforms P, for example made of PET, in the beverage bottling industry. According to FIG. 1, blowing machine B includes as rotating part 1 a blowing wheel rotary-driven on an unspecified platform of a stationary part 2 and being provided with multiple circumferentially arranged blowing stations S, each having at least one divided blow mold 3.

The inventive principle, however, is likewise applicable in blowing machines, particularly in stretch blow-molding machines, where the blowing stations are arranged stationarily. Furthermore, it is suggested in FIG. 1 that the manufactured containers F are conveyed to a discharge conveyor 17 and away from the blowing machine B, yet without being intended not to integrate further container treating means into the blowing machine, such as sterilizing stations, labeling stations, irrigating stations, filling stations and/or the like.

A rotary union 5 is provided between the rotary part 1 in FIG. 1 and the stationary part 2 and serves to feed a primary function liquid temperature control system 6 for the blow molds 3 from the stationary part 2 or to combine a primary function temperature control system in the stationary part 2 or outside the blowing machine B with the blow molds 3 during production. Typically, shell molds of the divided blow molds 3 are held at another temperature level than e.g. floor molds, with a corresponding number of forward and backward runs from the rotary union 5 to the blow molds 3 being installed (not shown).

To each of the blowing stations S are assigned functional get-up components 4, typically electric servomotors, for secondary functions such as the control of stretching bar motions during production (not shown). Typically, these are frequency-converting servomotors with frequency converters and controlling and monitoring units arranged at the blowing stations. In said functional get-up components for secondary functions heat is either generated during production and/or delivered into same by thermal coupling or, if need be, even withdrawn therefrom due to cooler local ambient conditions.

To maintain/bring the functional get-up components 4 over long service lives during production at/to optimal operating temperatures, a liquid temperature control system T has been integrated, according to the disclosure, into the blowing machine B, primarily for functional get-up components 4. According to FIG. 1, at least a considerable portion of the liquid temperature control system T is located in the rotating part 1 and rotating therewith and is connected, for example via a forward run and a backward run through rotary union 5 with a central supply arranged inside stationary part 2 or outside blowing machine B. Alternatively (not shown in FIG. 1), the electrically operated liquid temperature control system T including at least one temperature control device might be operated as a stand-alone system in the rotating part 1 with regard to the liquid, i.e. without being connected to rotary union 5, and being supplied with or controlled by operating voltage or electrical signals from stationary part 2 e.g. via a collector ring arrangement.

A heating unit H used to bring the preforms P to the correct temperature has been integrated into the blowing machine according to FIG. 1, which comprises a control means 7 and heating elements 8 along a continuous conveyor element 9. This is where the preforms P are supplied e.g. in cold condition to a feeding star 11 with transfer arms by means of a supply element 10, and away from this star to a transfer star 12 where the preforms are gripped, e.g. in the mouth area, and then transferred to a hand-over star 13 with transfer arms in order to load the conveyor element 9. From said conveyor element 9, the heated preforms P are transferred to a hand-over star 14 with transfer arms from where they are individually transferred into the blow molds 3 that have been opened for this purpose. In the closed blow molds, each of said preforms is stretched by means of a stretching bar (not shown) and blow-molded by applying compressed air, while the rotating part 1 is rotating. The completed containers F, typically bottles, will then individually be removed from the opened blow molds 3 by means of a transfer star 15 with transfer arms and supplied, in this case by means of the same transfer star 12, to a take-away wheel 16 which loads discharge conveyor 17. Here, the transfer star 12 is used for both functions, as the mouth areas of preforms P and of containers F are of substantially the same size. However, it might be possible to provide another transfer star 12 for the blow-molded containers F.

FIG. 2 illustrates a liquid temperature control system T for functional get-up components 4 of secondary functions in the blow-molding process, the primary function thereof e.g. being the blast pressure control. A temperature control device 24 for heating a heat transfer liquid (water or oil) is arranged outside the rotating part 1 either inside the stationary part 2, separated by rotary union 5, or even (as suggested by the dot-dashed separating line 38) outside the stationary part 2 or even outside blowing machine B. A forward run 26 extends from the temperature control device 24 (optionally for heating or cooling the liquid) via rotary union 5 to a major temperature control circuit 28 in the rotary part 1. An auxiliary temperature control circuit 29 is branching from said major temperature control circuit 28. In said major temperature control circuit 28, a bypass connection 30 combines forward run 28 and a backward run 27 running from said rotary union 5 to the temperature control device 24. The temperature control device 24 is connected e.g. with a central control unit 25 (with the parameterizing section not shown). Downstream of the bypass connection 30, an electrically driven circulation pump 41 (if need be a rotational speed-controlled pump) is provided in the major temperature control circuit 28. Downstream of the bypass connection 30, a two-way mixing valve 31 with an electric actuator 32, e.g. an operating magnet, is installed in backward run 27 and connected, via a control line 34, with a sensing or sending element 33 used to pick up at least the temperature in the major temperature control circuit 28 downstream of the circulation pump 41 and to operate the two-way mixing valve 31 correspondingly. Further, a temperature sensor 35 and/or a pressure sensor 36 may be provided downstream of the circulation pump 41 in the major temperature control circuit 28. Such sensors may preferably be connected to the central control unit 25 in signal-transmitting manner, as also, if need be, actuator 32 of the two-way mixing valve 31 and an air conditioning device 23 provided in the major temperature control circuit 28 (if need be in backward run 27). As functional get-up components 4 multiple electric servomotors (or the frequency converters thereof) are provided in the major temperature control circuit 28, for example a servo/linear motor 19 of a stretching bar drive and here at least two more servomotors that are connected in series. Downstream of the last functional get-up component 4 in the major temperature control circuit 28 is a heating or cooling path 37 connected in the blowing wheel 1' and downstream thereof the air conditioning device 23.

Air conditioning device 23 for example serves to withdraw heat from the liquid and dissipate it into the environment or to collect heat and feed it into the major temperature control circuit 28 to provide for an additional local temperature control. The major part of the liquid temperature control can be done in the temperature control device 24. If need be, heat withdrawn from the air conditioning device 23 (e.g. interconnected as heat exchanger) can be used for heating other get-up components in rotating part 1.

According to FIG. 2, an auxiliary temperature control circuit 29 branches from major temperature control circuit 28 and is guided in said embodiment via three functional get-up components 4 and again returned downstream of the path 37 into the major temperature control circuit 28. The temperature control circuits 28, 29 can be operated at different temperature levels and/or different flow rates. For example, in the auxiliary temperature control circuit 29 the first functional get-up component 4 is a control box including an electric or electronic control 20. The subsequently following functional get-up component 4 is, for example, a control box including one or more frequency converters 21 or directly one or more frequency converters 21 of the electric servomotors. The dotted line illustrates a cooling or cold plate 22 or a cooled rear wall of the control box or the frequency converter(s) 21. Downstream or the rear wall 22 there is provided the auxiliary temperature control circuit 29 via an electric servomotor in the form of e.g. a rotating motor 18.

Another conceivable detail variant is illustrated in FIG. 2, according to which two forward runs 42 are branching from said forward run 26 towards e.g. the blow molds 3, and two (or one common) backward runs 43 from the blow molds 3 are entering the backward run 27. This would be an optional combination of the liquid temperature control system T for functional get-up components 4 with the major functional temperature control system of the blow molds.

The electric connections from the rotating part 1 to the stationary part 2 extend, for example, via a collector ring arrangement 5a that is either combined with rotary union 5 or provided separately thereof between said stationary and said rotating parts. Moreover, FIG. 2 illustrates that another forward run 44 branches e.g. from forward run 26 in the stationary part 2 and that another backward run 45 leads to backward run 27, where at least another temperature control circuit for functional get-up components can be connected, e.g. in the stationary part 2, for example in order to set the temperature of a platform area of the stationary part 2 or of servomotors or the like that are provided but not shown. At least one of such temperature control circuits of the temperature control system T arranged in the stationary part 2 may be of similar structure like the shown temperature control circuits 28, 29 inside rotating part 1.

The embodiment according to FIG. 3 of the liquid temperature control system T for functional get-up components 4 of secondary functions differs from that one according to FIG. 2 in many ways. Firstly, the liquid temperature control system T in the rotating part 1 is designed as a stand-alone system, i.e. also the air conditioning device 24 including forward and backward runs 26, 27 has been installed in the rotating part 1 and, if need be, is electrically connected via the central control unit 25 through the rotary union or a collector ring assembly 5a with supply lines 40 in the stationary part. 2. Secondly, a three-way mixing valve 31' is provided in the major temperature control circuit 28 at the junction between bypass connection 30 and forward run 26, said valve being operable via the actuator 32 and directly controlling the flows in forward run 26 and bypass connection 30. The major temperature control circuit 28 also includes three functional get-up components 4, acting on behalf of a large number thereof, that are connected in parallel and connected in series with the blowing wheel 1' or the heating or cooling path 37 thereof. According to the illustrated embodiment, three function get-up components 4 are connected in series in said at least one auxiliary temperature control circuit 29 that can be operated at a different temperature level than the major temperature control circuit 28, viz. for example a control box or an electronic or electric control unit 20, a control box or one or more frequency converters 21 and finally, downstream thereof, an electric servomotor 4 that might be, e.g. the rotary motor or the linear motor 18, 19 of FIG. 2. Also in this case, the auxiliary temperature control circuit 29 might include equipment (control) similar to that one of the major temperature control circuit 28. Moreover, the temperature control device 24 in the rotating part 1 might not be a stand-alone device and connected via the rotary union with a liquid supply (not shown).

The circulation pump 41 downstream of the three-way mixing valve 31' as well as the actuator 32 thereof are here controlled and/or supplied with operating voltage by the central control unit 25.

Figure 4:
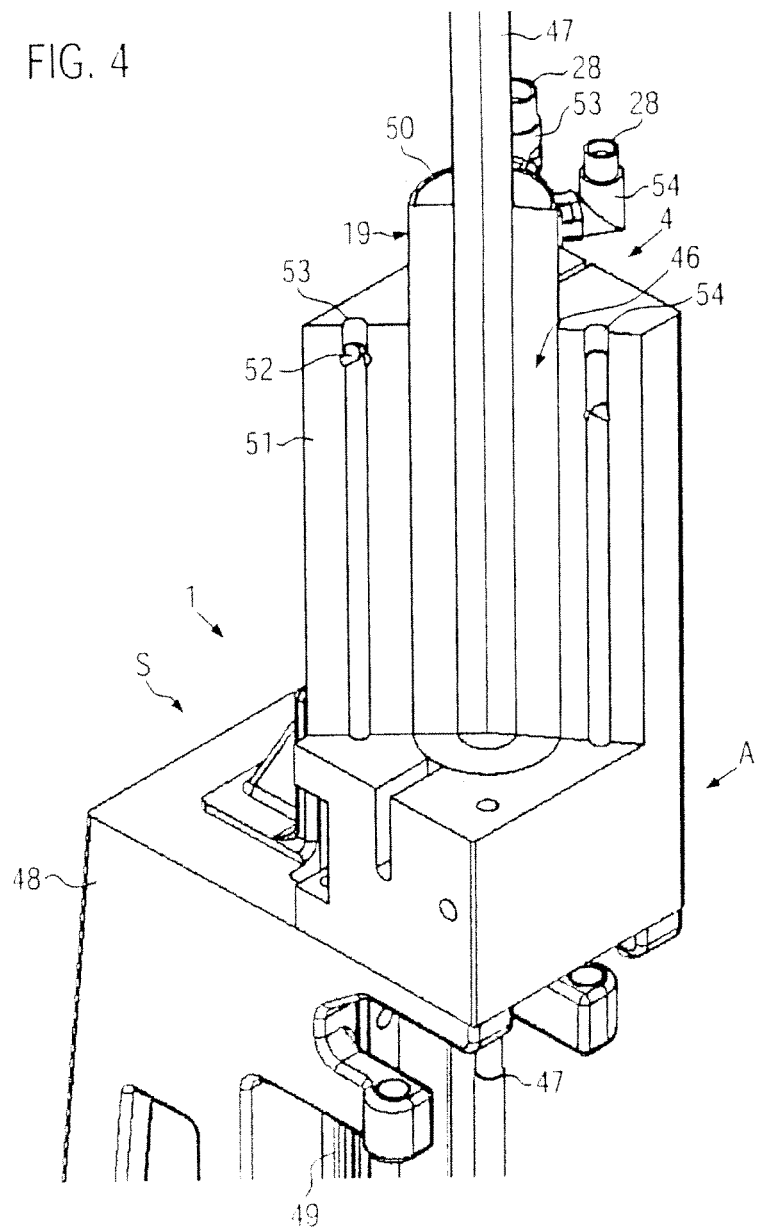
FIG. 4 is a perspective partial sectional view of a stretching bar driving system with electric servo/linear motor as direct drive of a stretching bar.

FIG. 4 is a specific example showing how a functional get-up component 4 of secondary functions e.g. has been integrated into said major temperature control circuit 28 of FIG. 2 or 3 which is in this case the servo/linear motor 19 in a stretching bar driving system A in the rotating part 1 and at a blowing station S of blowing machine B.

In said embodiment, the linear servomotor 19 comprises e.g. a tubular stator 46 and a runner 47 centrally linearly guided therein and extending downwards towards a stretching bar or a stretching slide (not shown). The servo/linear motor 19 is mounted onto a bearing block 48 that includes e.g. a longitudinal guide 49 for said stretching slide (not shown). The stator 46 can additionally be provided at its outer side with cooling ribs onto which, supported by a cooling directed air flow, cool air may impinge. In the example as shown, the stator 46 comprises a cooling jacket 50 with intake and escape connections 53, 54 which are connected e.g. to the major temperature control circuit 28 (see FIG. 2 or 3). The jacket 50 and/or the motor 46 are provided with corresponding channels (not shown) through which the liquid flows.

According to FIG. 4, the servo/linear motor 19 is arranged in a cooling element 51 comprising channels 52 through which the liquid flows, either from said intake and escape connections 54, 54 of the jacket 50 or via separate intake and escape connections 54, 54 (illustrated in dot-dashed manner). Said cooling element 51 might also be provided with cooling ribs (not shown) in supporting manner onto which a directed air flow can impinge. Thus, the servo/linear motor 19 is either cooled to discharge heat generated due to operation and to maintain a predetermined temperature level or heated in case its temperature should be too low. Apart from the heat generated due to operation it is also possible to discharge heat introduced due to heat coupling. To do so, cooling jacket 50 and cooling element 51 can either be used or just one of them. In case of additional cooling with a directed air stream same can be generated and directed by the stationary part through blowers and/or through the rotational motion of the rotating part 1. Furthermore, an air blow ejected during the blowing process and cooled due to expansion (or heat exchangers) may also be used.

The invention claimed is:

1. A blowing machine for manufacturing containers of correctly temperatured preforms, comprising blowing stations having correctly temperatured blow molds correctly temperatured through a liquid-driven primary function temperature control system, functional get-up components assigned to at least the blowing stations to at least one of control or monitor secondary functions during production, and, in order to bring at least some functional get-up component for secondary functions to the correct temperature, an electrically operated controllable liquid temperature control system supplied by at least one temperature control device integrated into the blowing machine and guided through the functional get-up components, the at least one temperature control device is located outside the blowing machine or inside the stationary part or inside the rotating part and is connected with the temperature control circuits via a forward run and a backward run, and wherein, in at least in one major temperature control circuit connected to the forward and the backward runs, at least one circulation pump, upstream of the circulation pump between the forward run and the backward run, one bypass connection is provided, and in one of the forward run or the backward run at least one electrically operable mixing valve is provided.

2. The blowing machine according to claim 1, wherein in the backward run downstream of the bypass connection a two-way mixing valve with electric actuator is provided and can be controlled by at least one temperature and/or pressure and/or flow rate sensor arranged in the temperature sender downstream of said circulation pump.

3. The blowing machine according to claim 1, and wherein a three-way mixing valve with an actuator is arranged in the forward run upstream of the circulation pump in a junction between the forward run and bypass connection and can be controlled via a temperature and/or pressure and/or flow rate sensor.

4. The blowing machine according to claim 1, and wherein the said major temperature control circuit extends via at least one functional get-up component, and downstream thereof via the blowing wheel.

5. The blowing machine according to claim 4, and an auxiliary temperature control circuit branches from the major temperature control circuit downstream of the circulation pump towards at least one control box, cooling element, servomotor, or frequency converter.

6. The blowing machine according to claim 4, wherein the at least one functional get-up component is a servomotor.

7. The blowing machine according to claim 4, wherein the major temperature control circuit extends through multiple functional get-up components connected either in series and/or in parallel to obtain the correct temperature.

8. The blowing machine according to claim 5, and wherein the auxiliary temperature control circuit branches towards multiple control boxes, cooling elements, servomotors, or frequency converters connected in parallel and/or in series.

\* \* \* \* \*